US005653253A

United States Patent [19]

Larsen

[11] Patent Number: 5,653,253

[45] Date of Patent: Aug. 5, 1997

[54] SAFETY ARRANGEMENT

[75] Inventor: Morten Larsen, Odense C, Denmark

[73] Assignee: Micro Matic A/S, Odense SV, Denmark

[21] Appl. No.: 607,368

[22] Filed: Feb. 27, 1996

[30] Foreign Application Priority Data

Mar. 31, 1995 [EP] European Pat. Off. .............. 95610015

[51] Int. Cl.[6] ............................ F16K 43/00; B65D 83/70

[52] U.S. Cl. .......................... 137/315; 137/212; 137/322; 222/400.7

[58] Field of Search .............................. 137/15, 212, 315, 137/322; 222/454.2, 400.7, 400.8, 402.1, 402.15; 251/149.4, 149.6

[56] References Cited

U.S. PATENT DOCUMENTS

| | | | |
|---|---|---|---|
| 4,388,945 | 6/1983 | Johnson et al. | 137/315 |
| 4,411,287 | 10/1983 | Hyde | 137/315 |
| 4,541,658 | 9/1985 | Bartholomew | 251/149.6 |
| 4,566,482 | 1/1986 | Stunkard | 137/240 |
| 4,728,010 | 3/1988 | Johnston | 137/212 |
| 5,054,743 | 10/1991 | Norkey et al. | 251/149.6 |
| 5,069,424 | 12/1991 | Dennany, Jr. et al. | 251/149.6 |
| 5,242,092 | 9/1993 | Riis et al. | 137/322 |

FOREIGN PATENT DOCUMENTS

| | | |
|---|---|---|
| 0623550A2 | 5/1994 | European Pat. Off. . |
| 9105547.4 | 5/1991 | Germany . |
| 91/02694 | 8/1991 | WIPO . |

*Primary Examiner*—George L. Walton

*Attorney, Agent, or Firm*—Jacobson, Price, Holman & Stern, PLLC

[57] ABSTRACT

In a double valve (4) for transportable containers (1) for distribution a liquid under pressure of a gas, a safety arrangement is adapted for preventing a person, who tries to dismount a valve while there is an over-pressure in the container, to be injured. The double valve has a housing (*5a,5b*) for detachable fixing the valve in a vertically mounted neck ring (2) in the container. In the housing a displaceable riser pipe (8), acted on by a pressure spring (10), is mounted having an elastomere valve ring (9) partly for closing a gas passage between the housing and the valve ring, partly a liquid passage between the opening in this and a valve plug (13) loaded by a second pressure spring in the riser pipe. Furthermore in the housing under the neck ring there is a catch (17) with a vertically, downwardly converging wedge (19) the narrow edge (21) of which is tiltingly supported by the lower edge (27) of a window (15) in the wall of the housing (*5b*). The catch comprises a spring (24) which is leaning against the inner side of the wall with an elastic force urging the wider edge (20) of the wedge to protrude through the window. The double valve can without any risk be dismounted by means of a special spanner (31) and a de-activation rod (32). The safety arrangement has a simple construction and is very reliable.

11 Claims, 4 Drawing Sheets

SAFETY ARRANGEMENT

BACKGROUND OF THE INVENTION

The invention concerns a safety arrangement for a double valve in particular for transportable containers of the type serving to distribute a liquid under pressure from a gas, said arrangement comprising a housing for detachable mounting the valve in a vertically placed neck ring in the container, and a riser pipe mounted displaceable in the housing acted on by a pressure spring, said riser pipe having an elastomere valve ring having both a blockable gas passage between the housing and the valve ring and a blockable liquid passage between the opening of this latter and a valve plug in the riser pipe being loaded from a second pressure spring, the arrangement also comprising a catch placed in the housing under the neck ring and having a vertically downwards converging wedge, the narrow edge of which is tiltingly supported at the bottom of a window in the wall of the housing.

Liquids such as beer and Coca-Cola are to a very great extent distributed in transportable containers under pressure of gaseous $CO_2$. During dismounting the pressure can shoot the valve out into the room with great force, whereby a person, when being hit by the valve, can be seriously injured.

In the European Patent Application NO. 0 489 829 a solution to this problem has been described. A catch is placed under the neck ring in a window of the housing of the double valve, said catch can be tilted around a lower edge in the window between an outwards tilted blocking position and an inwards tilted free position. At the bottom of the catch is also an inwardly turning projection. The catch is kept in an outwardly tilted position by means of a resilient finger placed on the riser pipe. In this position the valve must not be able to be dismounted by persons who do not have a special tool adapted for the purpose.

A special tool such belonging to the valve is in principle similar to the coupling head which is being coupled on to the double valve in order to dispense the liquid content from the container. The special tool, however, has a longer spindle and consequently, when being activated by the handle of the coupling, it pushes the riser pipe a little further down into the valve housing than is normally the case. The overpressure in the container is in this process rapidly blown off via the specially adapted coupling head. The valve can now be dismounted without any risk and this has now been possible due to the fact that the riser pipe, when being displaced downwardly at the same time, has brought the finger so far down that its lower end has been able to tilt the catch into the free position by stepping on its inwardly turning projection.

The construction known from the European Patent eliminates in an expedient manner the risk that an unauthorized person, who tries to dismount a pressure loaded valve, will be injured. Since the special tool, however, is a normal coupling head with prolonged spindle, the valve can nevertheless be dismounted by an unauthorized person by means of a normal coupling head, if the person in question realizes that he can put a disc between the spindle and the valve ring at the upper end of the riser pipe. The construction is furthermore rather complicated and the long finger can, by manipulating the riser pipe, disengage the catch which thereby is put out of function.

SUMMARY OF THE INVENTION

The object of the invention is to provide a safety arrangement of the type mentioned in the opening paragraph having a simplified construction and greater reliability of operation.

The novel and unique features, according to the invention, whereby this is obtained, consist of the fact that the catch comprises a spring which leans against the inner side of the wall with an elastic force urging the wide edge of the wedge to protrude through the window. This construction is simple and cheap. The spring and the wedge can be in one part, but can also be two separate parts, each of which being fixed in the housing. The construction will in both cases be completely reliable, since neither the spring nor the wedge will have any chance of inadvertently becoming disengaged.

By an advantageous embodiment the catch can mainly have the form of U with two flaps which jointly form the wedge and mutually are connected to a body having a lower projection which forms the spring, the latter can also have such a form that it will be pre-stressed when the catch is mounted in the window.

The catch can, in a simple way, be clamped into the window when the flaps each have a lower hook to catch the bottom plate of the window, and the spring has a lower bending meant for catching a lower edge in the wall of the housing. The correct position in the window is secured by a middle bar which is supporting the body of the catch.

The hooks must not protrude from the outer side of the housing's wall where they would be able to prevent the passage of the valve through the opening of the neck ring. Therefore, along the lower edge of the window there can be formed an inwardly countersunked area in the wall in order to hold the hooks.

The invention also relates to a dismounting spanner in form of a rod to press the riser pipe slantwise downwards in the housing and blow off the gas pressure, so that the valve can be dismounted without any risk at all. The spanner serves at the same time the object of unscrewing threaded valves.

When the valve has been pressed slantwise downwards in the housing by means of the spanner, access has been made in order to get the end of a de-activation rod pushed down between the body of the catch and the bar, and in this way the wedge now can be pulled into the housing. The valve can now be unscrewed from the neck ring by means of the spanner.

In order to easily and safely be able to get the end of the de-activation rod brought in between the bar and the body of the catch, the body can have an upper projection which, in the mounted position of the catch, extends slantingly up- and inwards in the housing. Inside the housing there also can be a guide to lead the end of the rod into the bar area between the body, the two flaps of this and the bar.

BRIEF DESCRIPTION OF THE DRAWINGS

The invention will be explained more fully by the following description of an embodiment, which just serves as an example, with reference to the drawings, in which.

DESCRIPTION OF THE PREFERRED EMBODIMENTS

Figure 1:
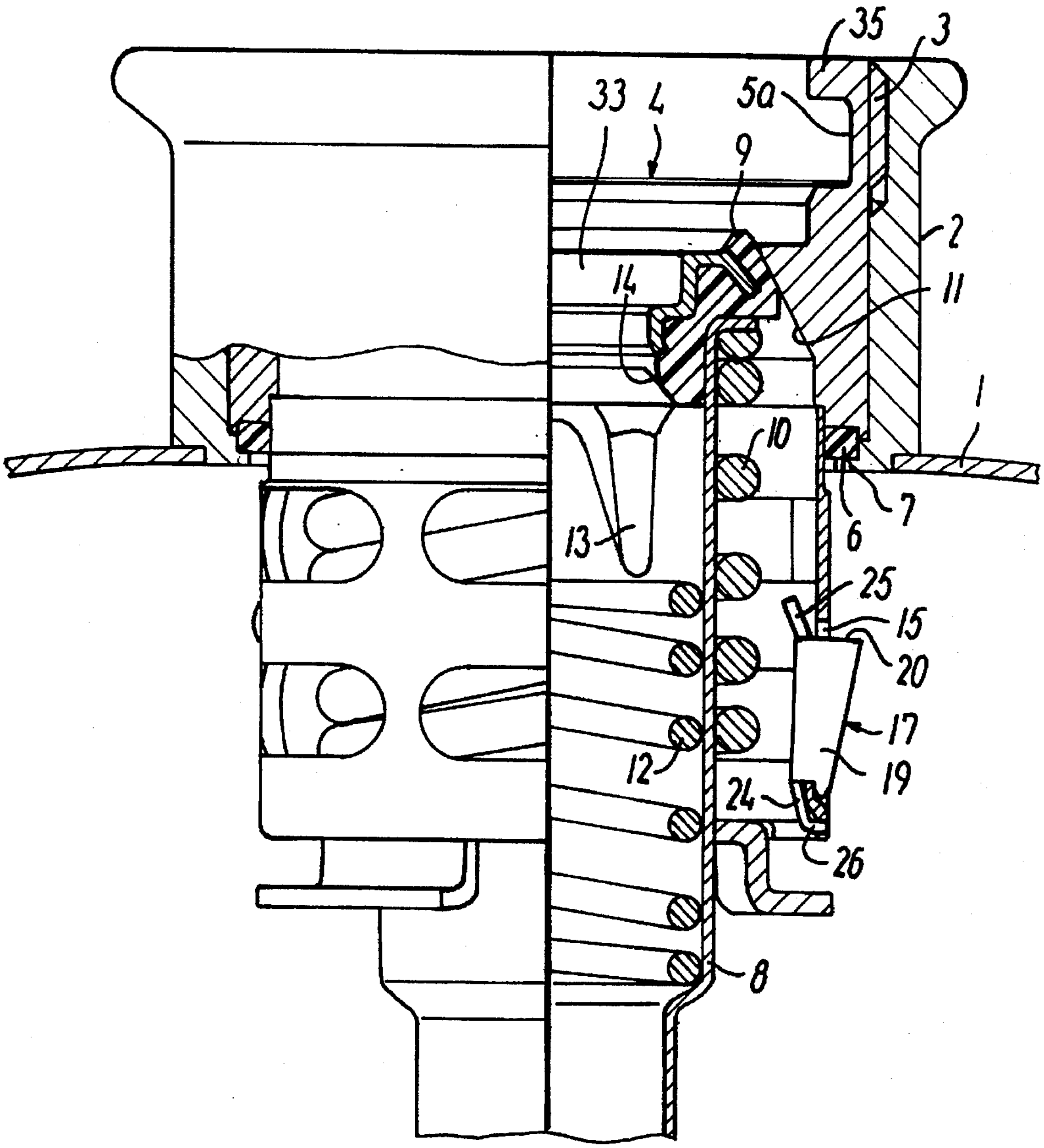
FIG. 1 shows, partly in section, a double valve, which is mounted in a pressure container and has a safety arrangement according to the invention.
Figure 2:
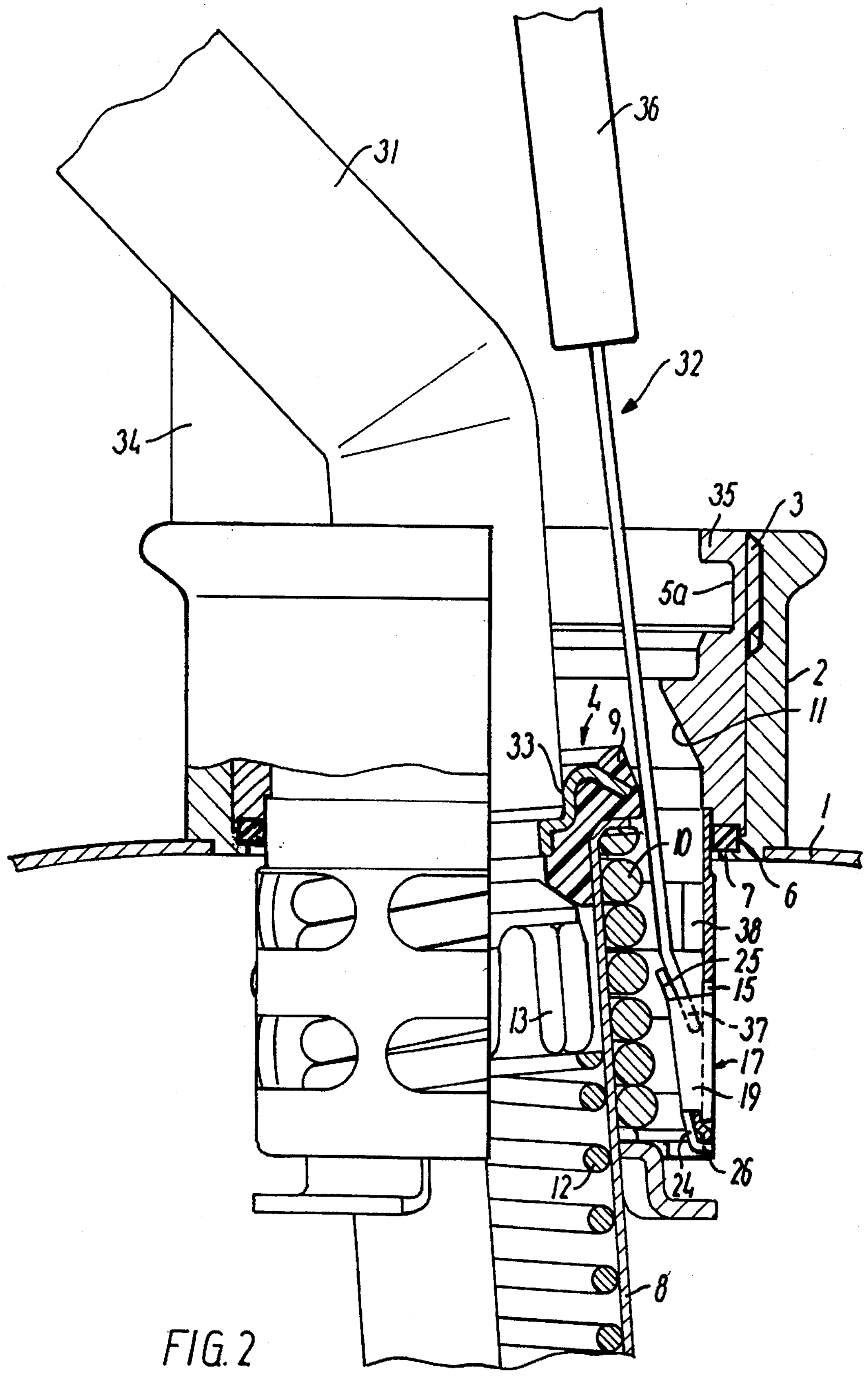
FIG. 2 shows the same, but during dismounting at de-activated safety arrangement.
Figure 3:
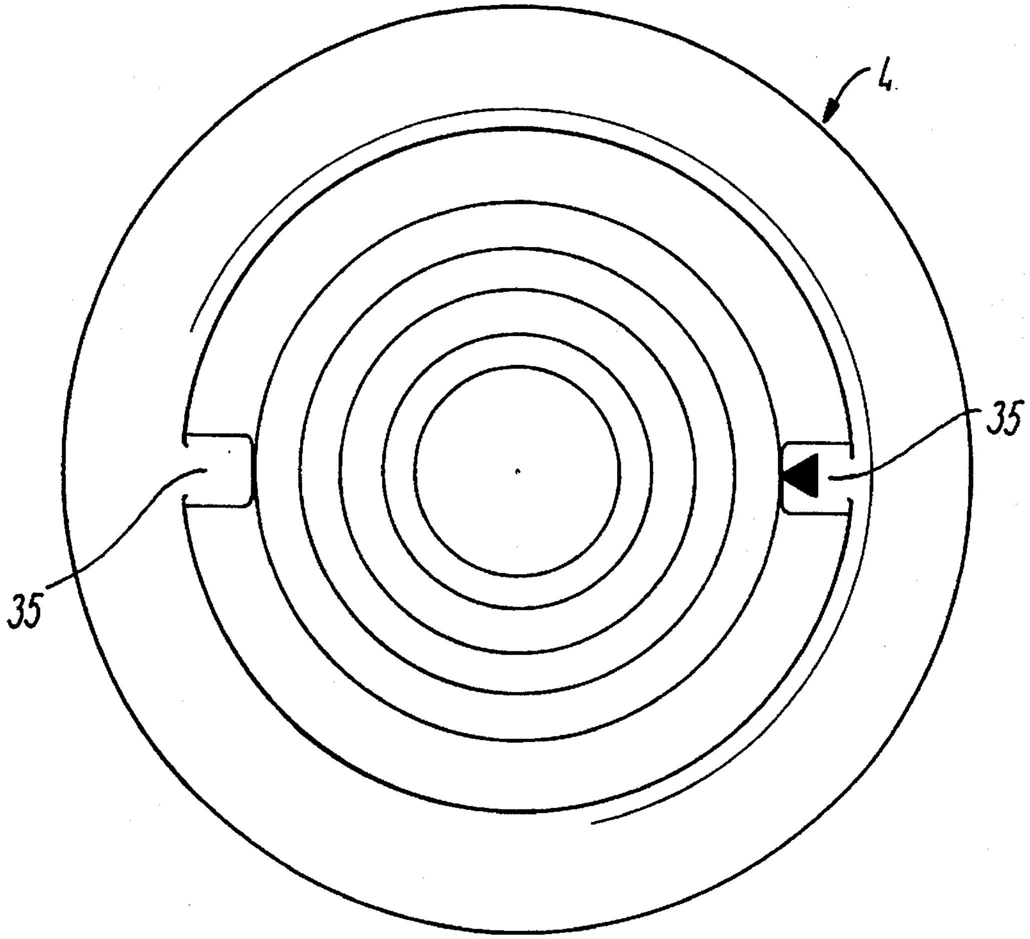
FIG. 3 is a top view of the valve from FIG. 1.

In FIG. 1 and 2 a pressure container 1 is seen, only in fragments, having a neck ring 2, in which a double valve 4 is screwed in by means of a thread 3.

The double valve has a housing *5a,b,* the upper part *5a* of which is screwed tightly down against a ring seal 6 which is placed on an inside collar 7 in the neck ring 2. The lower part *5b* of the housing is extending freely down into the container under the neck ring 2 and is supporting a riser pipe 8, which on the top has an elastomere valve ring 9, which by a pressure spring 10 is kept tightly against a valve seat 11 in the upper part *5a* of the housing, when the valve is closed. When the valve is open a gas passage emerges between the valve ring 9 and the seat 11.

Inside the riser pipe a second pressure spring 12 is placed holding a valve plug 13 tightly against an inner valve seat 14 in the valve ring 9, when the valve is closed. When the valve is open a liquid passage emerges between the plug 13 and the valve seat 14.

Figure 6:
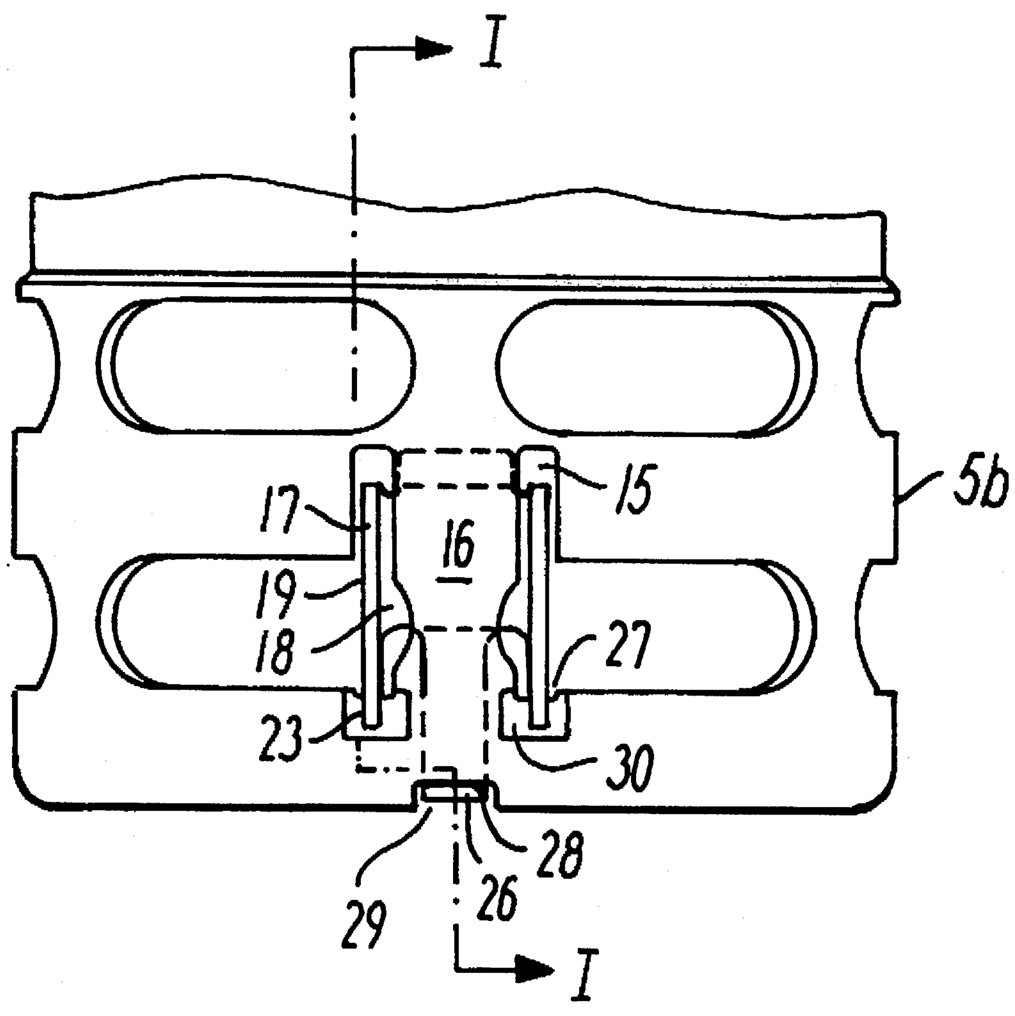
FIG. 6 shows, seen from the side, a section of the bottom part of a housing for the double valve from FIG. 1, with the catch from FIG. 4 and 5 mounted in a window in the wall of the housing.

At the bottom of the wall of the housing part *5b* there is, as can be seen best from FIG. 6, formed a window 15 with a middle bar 16. In this window a catch has been clamped, designated in the whole with the reference number 17.

Figure 4:
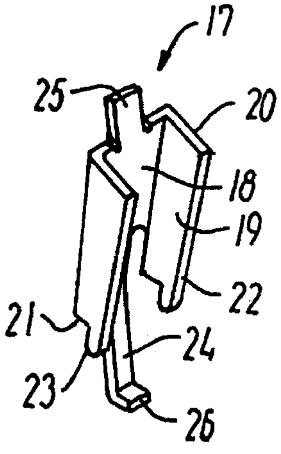
FIG. 4 is a the front perspective brief of, a catch for the safety arrangement from FIG. 1 and 2.
Figure 5:
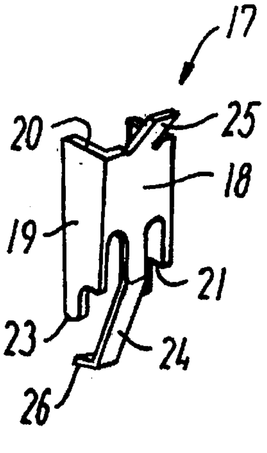
FIG. 5 is a back perspective, perspective view of the catch.

The catch is shown in perspective in FIG. 4 and 5. In this case it has been made in one piece from a metal sheet, but can also be casted in metal or plastic. The catch has mainly the form of an U with a body 18 and two flaps 19. Each flap is formed as a downwardly converging wedge with a upper wider edge 20 and a lower narrow edge 21. The latter edge 21 has furthermore at the free side edge of the flap 22 a downwardly turning hook 23.

On the body 18 there is formed partly a lower projection 24 and partly an upper projection 25. The lower projection 24 extends slantingly forwardly in the direction of the free side edges 22 of the flaps and thus functions as a pre-stressed spring when the catch is mounted in the window 15. The upper projection 25 extends slantingly inwardly in the opposite direction of the free edges 22 of the flaps. The object of this projection will be explained in details later on.

At the bottom the lower projection 24 has a bending 26. The catch 17 is mounted by clamping into the window 15, the hooks 23 engaging the outer side of the lower edge 27 of the window 15 and the bending 26 of the lower projection 24 engaging a lower edge 28 in an incision 29 in the wall of the lower housing *5b* while the body 18 supports the inner side of the bar 16. On both of the places where the hooks 23 engage the lower edge 27 of the window, the wall of the housing has a countersunked area 30 for accommodating the hooks, so that they do not project outside the outer wall of the housing and thereby present an obstacle for the valve, when the valve, during mounting or dismounting, must pass through the opening of the neck ring.

When the catch 17 in this way is clamped into the window 15, the upper wide edges of the flaps 19 are protruding outwardly on each side of the bar 16 in the window 15, the body of the catch being pressed against the inner side of the bar by the pre-stressed lower projection 24, which functions as a pre-stressed leaf spring. The valve cannot be dismounted due to the fact that the upper edges 20 of the flaps, when attempts are made to this effect, will hit the lower side of the neck ring 2. FIG. 2 shows how the valve can be dismounted by means of a dismounting spanner 31 and a de-activation rod 32.

The dismounting spanner 31 has form of a rod, the lower part of which fits into a depression 33 at the top of the valve ring 9. By means of the spanner the riser pipe can, as shown, be slantingly pressed down in the housing. Thereby the gas overpressure in the housing will be blown off rapidly and then the valve can be dismounted without any risk for the operator. The correct inclining position is fixed by an abutting stop 34 on the spanner 31.

On top of the upper part *5a* of the valve housing there are two coupling pivots 35 for coupling a coupling head not shown. One of these is marked by an arrowhead indicating that the catch is situated vertically under this pivot. The riser pipe is therefore, during dismounting, slantingly pressed towards the opposite pivot, so that there, under the pivot marked with an arrow, will emerge a free opening between the valve ring 9 and the valve seat 11.

The de-activation rod 32 is now via this opening, by holding a handle 36 of the rod, pushed down between the body 18 of the catch and the bar 16. At the bottom the rod has a bending 37, which on the top hits the upper inclined projection 25 of the body and on the bottom hits the bar. By driving the de-activation rod further down the bended end of the rod is squeezing itself in between the bar and the body of the catch tilting the catch inwardly, so that the flaps 19 are pulled into the housing. The valve can now freely pass through the opening of the neck ring when the operator is unscrewing the valve from the neck ring by means of the spanner 31.

In order to facilitate the work of catching the area where the end of the rod 32 is to be driven in for de-activating the catch, there is over the latter arranged a guide 38 for leading the end of the rod down towards the catch.

I claim:

1. The safety arrangement for a double valve in particular for transportable containers of the type serving to distribute a liquid under pressure from a gas, said arrangement comprising a valve housing for detachable mounting the valve in a vertically placed neck ring in the container, and a riser pipe mounted displaceable in the valve housing acted on by a pressure spring, said riser pipe having an elastomere valve ring having both a blockable gas passage between the valve housing and the valve ring and a blockable liquid passage between an opening of the valve ring and a valve plug in the riser pipe being loaded by a second pressure spring, the arrangement also comprising a catch placed in the valve housing under the neck ring and having a vertically downwards converging wedge, the narrow edge of which is tiltingly supported at the bottom of a window in a wall of the valve housing, characterized in that the catch comprises a spring integral with the catch and arranged so as to lean against an inner side of the wall below the window with an elastic force urging the wide edge of the wedge to protrude through the window to prevent unauthorized removal of the valve housing.

2. The safety arrangement according to claim 1, characterized in that the catch mainly having form of an U with two flaps which together form the wedge and are mutually connected by a body.

3. The safety arrangement according to claim 2, characterized in that said spring is defined by a lower projection on the body of the catch, said lower projection bearing against said inner side of the wall in such a manner that said elastic force urges the body of the catch toward the inner side of the wall thus urging the wide edge to protrude through the window.

4. The safety arrangement according to claim 3, characterized in that the spring having such a form that it is being pre-stressed when the catch is mounted in the window.

5. The safety arrangement according to claim 3, characterized in that the flaps each having a lower hook for engaging the lower edge of the window and that the spring having a lower bending for engaging a lower edge in the wall of the window.

6. The safety arrangement according to claim 2, characterized in that the body having an upper projection which extends slantingly upwards and into the value housing when the catch is in the mounted position.

7. The safety arrangement according to claim 2, characterized in that along the lower edge of the window there is formed an inwardly countersunked area in the wall of the value housing.

8. The safety arrangement according to claim 1, characterized in that a part of the wall of the value housing forms a middle bar in the window.

9. The safety arrangement according to claim 1, characterized in that it comprises a dismounting spanner for slantingly pressing the riser pipe down in the value housing.

10. The safety arrangement according to claim 1, and further comprising a de-activation rod adapted for insertion into an opening which emerges between the value housing and the valve ring when the riser pipe is pressed down slantingly in a direction away from the window, for pushing on the catch in such a manner that said catch is drawn radially inwardly against said elastic force until said wide edge of the wedge is drawn completely into the window.

11. The safety arrangement according to claim 10, characterized in that over the catch there is a guide for the de-activation rod.

* * * * *